Aug. 14, 1945.   A. OFFNER   2,381,980
SOUND FILM PRINTING OPTICAL SYSTEM
Filed Aug. 28, 1943   4 Sheets-Sheet 1
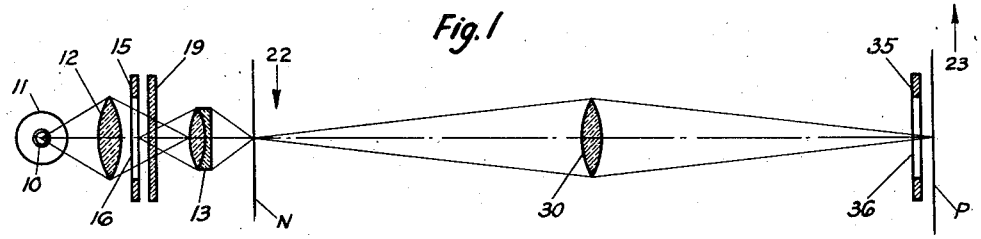
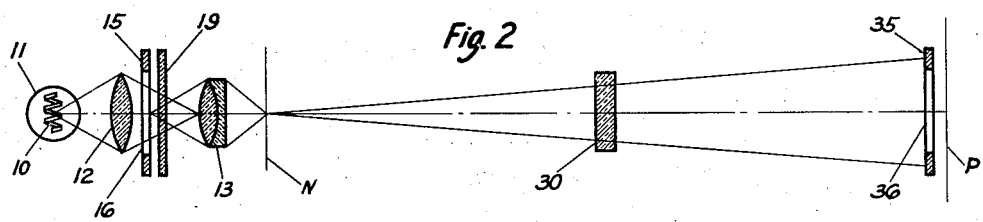
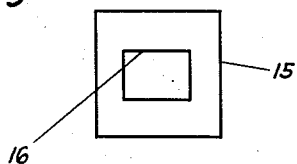
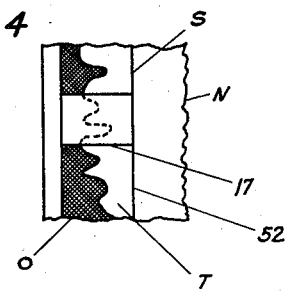
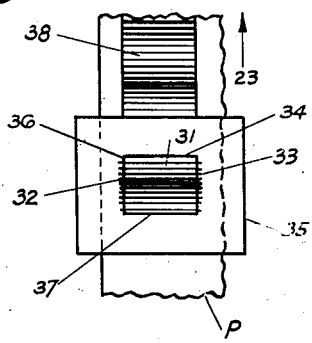
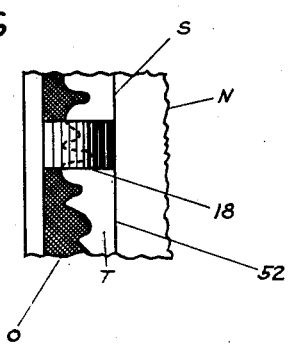
INVENTOR:
Abe Offner
BY *Otto J. Nathanson*
AGENT Aug. 14, 1945.  A. OFFNER  2,381,980
SOUND FILM PRINTING OPTICAL SYSTEM
Filed Aug. 28, 1943  4 Sheets-Sheet 2

INVENTOR:
Abe Offner
BY *Otto J. Nathansohn*
AGENT

Aug. 14, 1945.　　　　　A. OFFNER　　　　　2,381,980
SOUND FILM PRINTING OPTICAL SYSTEM
Filed Aug. 28, 1943　　　4 Sheets-Sheet 3
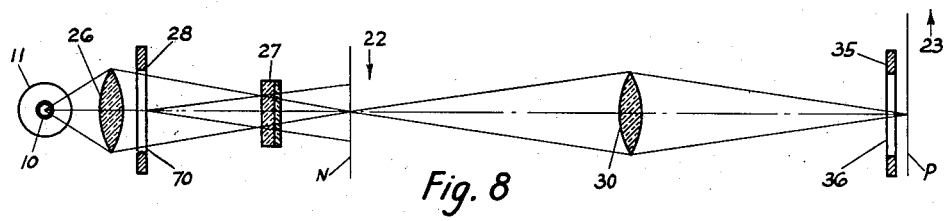
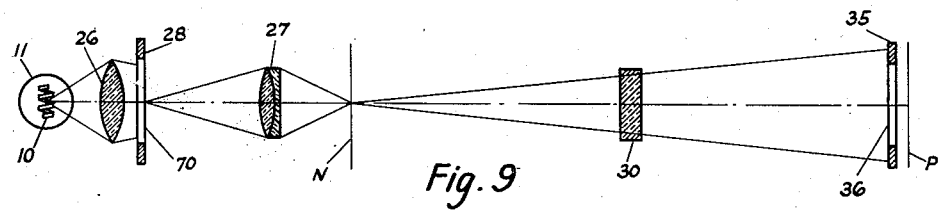
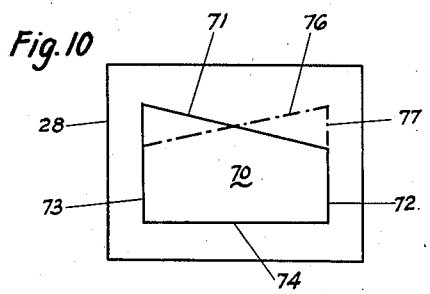
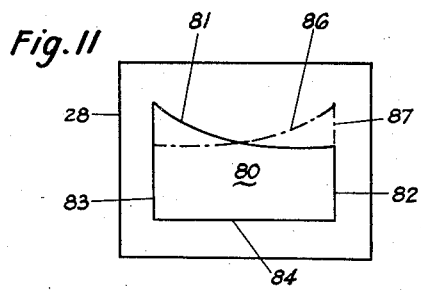
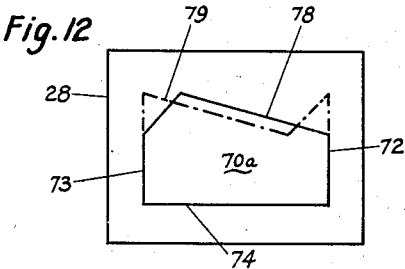
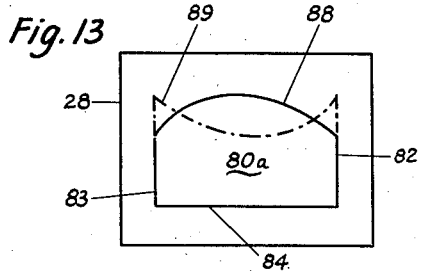
INVENTOR:
Abe Offner
BY
AGENT

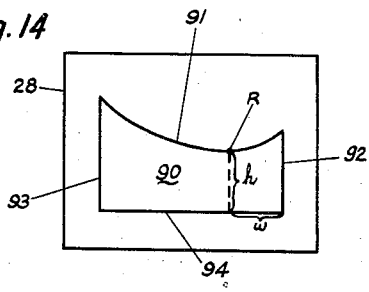
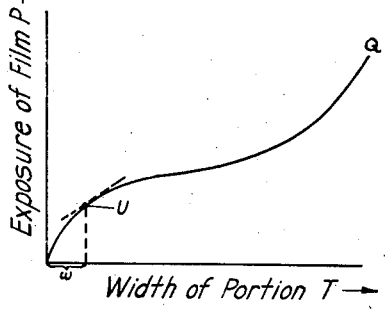
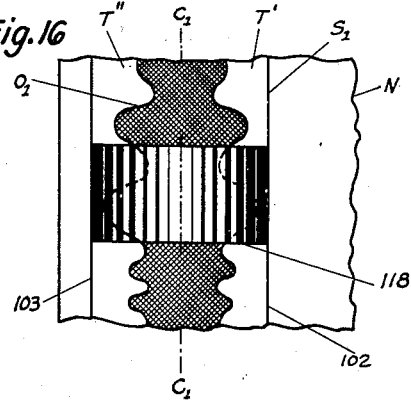
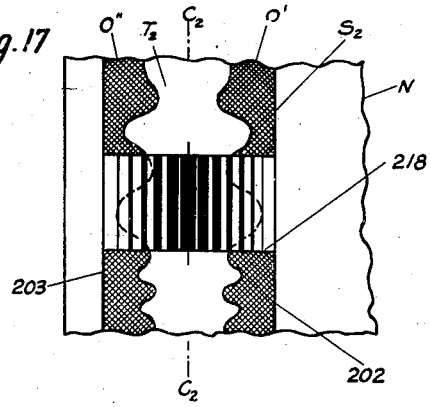
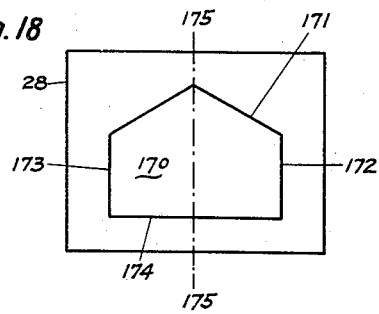
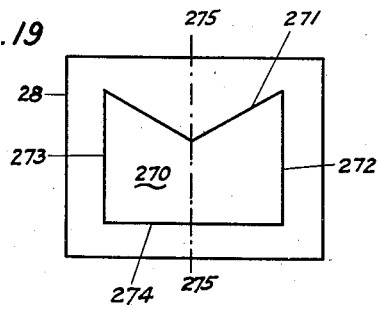
INVENTOR:
Abe Offner Patented Aug. 14, 1945

2,381,980

UNITED STATES PATENT OFFICE 2,381,980

SOUND FILM PRINTING OPTICAL SYSTEM

Abe Offner, Brooklyn, N. Y., assignor to J. A. Maurer, Inc., New York, N. Y., a corporation of New York Application August 28, 1943, Serial No. 500,394

12 Claims. (Cl. 88—24)

This invention relates to optical systems for sound track printers and, more particularly, it relates to optical systems of this kind by which a variable area sound track may be converted into a variable density sound track. The film having thereon the variable area sound track is termed "negative film," and the film on which the variable density sound track is produced is termed "positive film," throughout this specification so that these terms are used therein without reference to any particular type of film stock.

Still more particularly, the invention relates to sound printing optical systems in which the conversion of the variable area sound track into the variable density sound track is accomplished substantially as follows: A first light spot is formed at a first position in the optical system so as to be more or less obscured by the opaque portion of the variable area sound track when the negative film moves vertically through a plane at right angles to the optical axis of the system. The light flux passing through the first light spot is, in the vertical plane, focused at a second position in the optical system, while, in the horizontal plane, it is diffused at the second position. The image of the first light spot as obscured by the opaque portion of the variable area sound track, which thus is formed at the second position, is a second light spot, and the illumination of the second light spot varies in a vertical direction. The light flux passing through the second light spot is employed to effect the exposure of the positive film which moves vertically through another plane at right angles to the optical axis of the system, and thereby the variable density sound track is produced on the positive film.

Conversion sound printing optical systems of this type are disclosed, for example, in Sandvik et al. Patent No. 2,298,422, issued October 13, 1942, and in J. A. Maurer, Jr.'s, applications Serial Nos. 449,797, now Patent Number 2,366,040 issued December 26, 1944, and 449,798, which applications were filed July 4, 1942, and are assigned to the same assignee as this application. The first light spot referred to in the preceding paragraph is a uniformly illuminated rectangle in all of these optical systems so that the exposure of the positive film therein is linearly related to the horizontal extension, or width, of the transparent portion of the variable area sound track.

The light transmission of a developed film, however, is not linearly related to its exposure. As long, therefore, as the first light spot in the optical systems of Patent No. 2,298,422 and applications Serial Nos. 449,797 and 449,798 is a uniformly illuminated rectangle, the light transmission of the variable density sound track will not be linearly related to the width of the transparent portion of the variable area sound track after the positive film has been developed. Distortions hence would occur if sound were reproduced directly from the variable density sound track on the developed positive film.

For that reason, it has been necessary heretofore to transfer the variable density sound track from the positive film onto another film by a further printing operation. For the same reason, it furthermore has been necessary to employ, as the positive film and the film having thereon the further print of the variable density sound track, only those kinds of film stock whose emulsion characteristics approach linearity over as wide a range as possible and, moreover, to employ them in such a manner that effective use was made of only the straight portions of their emulsion characteristics. The first of these requirements excludes the employment of a number of film stocks now available which, except for their emulsion characteristics, would make excellent sound track carriers, and the second requirement results in an objectionable restriction of the volume range of the sound reproduced from the further print of the variable density sound track.

For the purpose, therefore, of producing on the positive film a variable density sound track from which undistorted sound can be reproduced directly, and/or for the purpose of making possible the employment, without causing distortions on account of the non-linearity of its emulsion characteristic, of any kind of film stock as the positive film and, if desired, the film onto which a further print of the variable density sound track is made, and/or for the purpose of effectively enhancing the volume range of the reproduced sound, it is desirable to establish, in the conversion sound printing optical systems of the type under discussion, a non-linear relationship between the width of the transparent portion of the variable area sound track and the exposure of the positive film. The non-linear relationship must have such a character as to compensate for the non-linearity of the emulsion characteristic of either the positive film or both the positive film and the film onto which the further print of the variable density sound track is to be made so that a linear relationship is established between said width and the light transmission of the variable density sound track after the film, or films, have been developed. This compensating non-linear relationship, however, is merely an example of a non-linear relationship which it is desirable to establish between the width of the transparent portion of the variable area sound track and the exposure of the positive film in the conversion sound printing optical systems of the type under discussion. In order to produce variable density sound tracks of certain characteristics other than the ones discussed hereinbefore, it may also be desirable to establish, in those optical systems, non-linear relationships between said width and said exposure which are of a second degree, a third degree, a complex, or any other character, depending upon the particular requirements of a given actual case.

It will readily be understood by those skilled in the art that non-linear relationships of the kind described in the preceding paragraph are established preferably by means of which may conveniently be introduced into the optical systems under discussion, and which may be manufactured with comparative ease and yet with any desired degree of accuracy.

It is, therefore, the primary object of the invention to provide, in conversion sound printing optical systems of the type under discussion, means for establishing a non-linear relationship between the width of the transparent portion of the variable area sound track and the exposure of the positive film.

A further object of the invention is to provide, in those optical systems, means for establishing a non-linear relationship between said width and said exposure which is of a second degree character.

Another object of the invention is to provide, in those optical systems, means for establishing a non-linear relationship between said width and said exposure which is of a third degree character.

Another object of the invention is to provide, in those optical systems, means for establishing a non-linear relationship between said width and said exposure which is of a complex character.

Another object of the invention is to provide, in those optical systems, means for establishing a non-linear relationship between the width of the transparent portion of the variable area sound track and the exposure of the positive film which is of such a character that a linear relationship is established between said width and the light transmission of the variable density sound track after the positive film has been developed.

Another object of the invention is to provide, in those optical systems, means for establishing a non-linear relationship between the width of the transparent portion of the variable area sound track and the exposure of the positive film which is of such character that a linear relationship is established between said width and the light transmission of the variable density sound track after development of a film onto which the variable density sound track has been printed from the positive film.

Another object of the invention is the provision of means for establishing non-linear relationships of the kind described which may conveniently be introduced into those optical systems.

Another object of the invention is the provision of such means which may easily be manufactured.

Another object of the invention is the provision of such means which may be manufactured with any degree of accuracy.

Another object of the invention is the provision, in conversion sound printing optical systems of the type under discussion, of means making possible the employment, as carrier of the variable density sound track, of any kind of film stock irrespectively of its emulsion characteristic and without causing distortions resulting from the non-linearity thereof.

Another object of the invention is the provision, in those optical systems, of means by which the volume range of the sound reproduced from the developed variable density sound track is effectively enhanced.

Another object of the invention is the provision of conversion sound printing optical systems in which a variable density sound track is produced from which undistorted sound can be reproduced directly.

Still other objects and advantages of the invention include those which are hereinafter stated or apparent, or which are incidental to the invention.

The objects of the invention are substantially achieved by providing a conversion sound printing optical system of the type under discussion in which the illumination of the first light spot referred to hereinabove varies in a horizontal direction. The amount of light flux passing through the first light spot of this optical system then is a non-linear function of the width of the transparent portion of the variable area sound track, and any desired character may be given to this non-linear relationship by varying the illumination of the first light spot in appropriate relation to its horizontal extension. The exposure of the positive film is then also a non-linear function of that width since it is substantially equal to the amount of light flux passing through the first light spot, and the character of this function is the same as the character given to the first mentioned non-linear relationship. If, for example, the illumination of the first light spot varies horizontally so that the amount of light flux passing through it is a second degree function of said width, the exposure of the positive film is also a second degree function of said width.

The illumination of the first light spot may be varied horizontally by any suitable means. There may be employed, for example, a light shading member whose light absorption is so related to its horizontal extension that a non-linear relationship of the desired character is established between the width of the transparent portion of the variable area sound track and the amount of light flux passing through the first light spot. In the presently preferred embodiments of the invention, however, a light spot of horizontally varying illumination is formed in the plane of the negative film by employing the following arrangement for illuminating the variable area sound track in a non-uniform manner. A screen is provided with an opening whose height, that is, the distance of its two horizontal edges from one another, varies. This opening is uniformly illuminated by light flux from a suitable light source, and an image of the opening is formed in the plane of the negative film by imaging means acting in only the horizontal plane, for example, a cylindrical lens with its cylinder axis vertical. In addition, at a position beyond the screen with the opening, an image of the light source is formed by condensing means acting in the vertical plane, for example, a spherical condenser lens. The result of this imagery is the formation, in the plane of the negative film, of a light spot whose illumination varies horizontally in the same manner as the height of the opening varies in relation to its distance from one of the two vertical edges of the opening. By appropriately varying the height of the opening it is therefore possible to vary the illumination of the light spot horizontally in the plane of the negative film so as to establish any desired non-linear relationship between the amount of light flux passing through this light spot and the width of the transparent portion of the variable area sound track. The light spot of horizontally varying illumination is on the variable area sound track when the negative film moves vertically through its plane, and it may take the place of the first light spot referred to hereinabove either directly or by having its image formed at some position in the optical system by imaging means acting in both the vertical and horizontal planes.

In the foregoing brief explanation of the state of the art and summary of the present invention, and throughout this specification, the terms "vertical," "vertical direction," and "vertical plane," and "horizontal," "horizontal direction," and "horizontal plane," and the term "co-ordinate planes," are used as defined in applications Serial Nos. 449,797 and 449,798, to which definitions reference is therefore made. Reference is also made to the definitions contained in those applications of the terms "plane of the negative film" and "plane of the positive film," which terms are used throughout this specification as defined in those applications.

Furthermore, the term "variable area sound track" is used throughout this specification as including the two kinds of variable area sound track known in the art as unilaterial and bilateral, or symmetrical, variable area sound tracks. Wherever it seemed necessary to distinguish between these two kinds of variable area sound tracks, this has been done by expressly referring to a unilateral, or a symmetrical, variable area sound track. In any case, the term also includes variable area sound tracks recorded by means of any of the well known methods for ground noise reduction.

Finally, the term "illumination" is used throughout this specification as referring to the amount of light flux per unit area. The description, for example, of a light spot as being of uniform illumination means that the light flux is distributed over the area of the light spot in such a manner that the amounts of light flux at any two points thereon are equal. Correspondingly, the description of a light spot as being of vertically, or horizontally, varying illumination means that the light flux is distributed over the area of the light spot in such a manner that the amounts of light flux at any two points thereon which are on different horizontal, or vertical, levels, respectively, thereof, are, in general, different.

The invention will be better understood when the following description is considered with the accompanying drawings of several presently preferred embodiments thereof, and its scope will be pointed out in the appended claims.

In the drawings:

Fig. 1 is a diagrammatic longitudinal section in the vertical plane of a conversion sound printing optical system in which the invention has been embodied.

Fig. 2 is a corresponding section in the horizontal plane.

Fig. 3 is an enlarged elevation of a screen with an opening employed in the optical system of Figs. 1 and 2.

Fig. 4 shows an enlarged section of a negative film having thereon a unilateral variable area sound track, and a uniformly illuminated light spot which would be formed in the plane of the negative film were the invention not embodied in the optical system of Figs. 1 and 2.

Fig. 5 is an enlarged elevation of a part of the optical system of Figs. 1 and 2, showing the light spot of vertically varying illumination formed therein in the plane of the positive film, and the variable density sound track which is produced on the positive film.

Fig. 6 shows an enlarged elevation of a negative film having thereon a unilateral variable area sound track, and the light spot of horizontally varying illumination which is formed according to the invention in the plane of the negative film of the optical system of Figs. 1 and 2.

Fig. 8 is a diagrammatic longitudinal section in the vertical plane of a conversion sound printing optical system in which another embodiment of the invention has been incorporated.

Fig. 9 is a corresponding section in the horizontal plane.

Fig. 10 is an enlarged elevation of a screen with an opening employed in the optical system of Figs. 8 and 9, the height of the opening varying in such a manner that the exposure of the positive film is a second degree function of the width of the transparent portion of the variable area sound track.

Fig. 11 is an elevation of the screen of Fig. 10, the screen being provided with an opening whose height varies in such a manner that said exposure is a third degree function of said width.

Fig. 12 shows a modification of the opening shown in Fig. 10.

Fig. 13 shows the corresponding modification of the opening shown in Fig. 11.

Fig. 14 is an elevation of the screen of Fig. 10, the screen being provided with an opening whose height varies so that the non-linear relationship between said width and said exposure is of such a character that the light transmission of the variable density sound track is a linear function of said width after the positive film has been developed.

Fig. 15 shows a curve representing, in general, the relationship between said width and said exposure which results in a linear relationship between said width and said light transmission after development of the positive film.

Fig. 16 shows an enlarged elevation of a negative film having thereon one type of a symmetrical variable area sound track, and a light spot of horizontally varying illumination which is symmetrical about its vertical center line.

Fig. 17 shows an enlarged elevation of a negative film having thereon another type of a symmetrical variable area sound track, and another light spot of horizontally varying illumination which is symmetrical about its vertical center line.

Figs. 18 and 19 are elevations of the screen of Fig. 10, the screen being provided with openings which are adaptations of the opening shown in Fig. 10 for use with symmetrical variable area sound tracks of either type.

Figure 20:
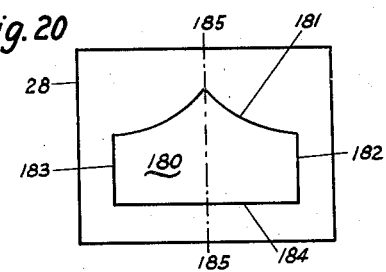
Figure 21:
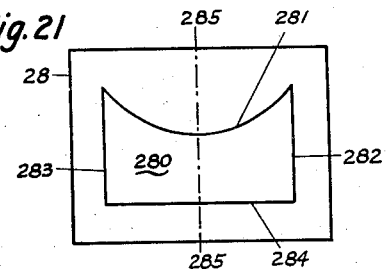
Figure 22:
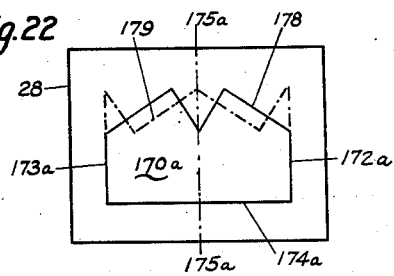
Figure 23:
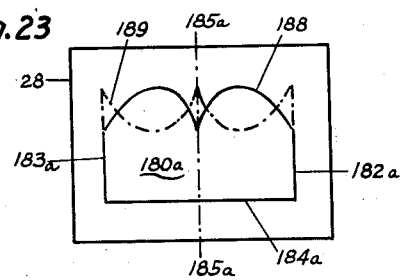

Figs. 20 and 21 show openings which are corresponding adaptations of the opening shown in Fig. 11, and Figs. 22 and 23 show openings which are corresponding adaptations of the openings shown in Figs. 12 and 13, respectively.

Figure 24:
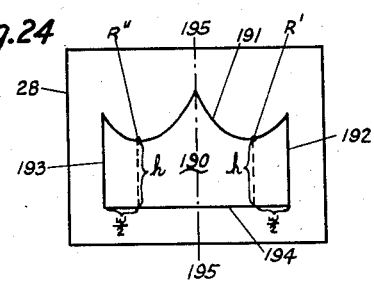

Fig. 24 is an elevation of the screen of Fig. 10 the screen being provided with an opening which is an adaptation of the opening shown in Fig. 14 for use with symmetrical variable area sound tracks of the type shown in Fig. 16.

Figure 25:
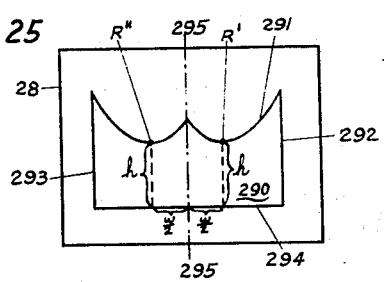

Fig. 25 is an elevation of the screen of Fig. 10, the screen being provided with an opening which is an adaptation of the opening shown in Fig. 14 for use with symmetrical variable area sound tracks of the type shown in Fig. 17.

Figure 26:
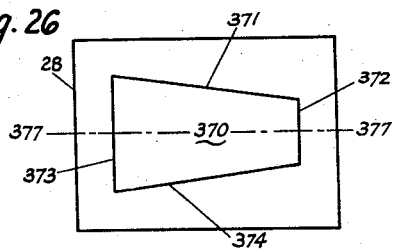

Fig. 26 shows a further modification of the opening shown in Fig. 10.

In Figs. 1 and 2, there is shown by way of example one of the conversion sound printing optical systems disclosed in application Serial No. 449,798. Figs. 1 and 2 of this application are identical with Figs. 1 and 2 of application Serial No. 449,798, except for the addition of a certain part as will be explained hereinafter. Also, Figs. 3 to 5 of this application which relate to certain other parts of the optical system of Figs. 1 and 2, are identical with Figs. 3 to 5 of application Serial No. 449,798. Like parts are therefore designated by like reference characters in the two applications. Reference is made to the detailed explanation given in application Serial No. 449,798 of the manner in which the conversion, by printing, of a variable area sound track into a variable density sound track ordinarily is accomplished in the optical system of Figs. 1 and 2. This explanation may be recapitulated for the purpose of this specification as follows:

As has already been pointed out hereinabove, the conversion accomplished in the optical system of Figs. 1 and 2 involves the formation therein of a light spot of vertically varying illumination in such a manner that the light flux passing through this light spot may be employed to effect the exposure of the positive film when it moves vertically through a plane at right angles to the optical axis of the system. In the example illustrated, the light spot of vertically varying illumination is light spot 31 (Fig. 5) which, in this case, is formed in the plane of the positive film P as will be described hereinbelow. The light flux passing through light spot 31 effects the exposure of film P when film P moves vertically through its plane in the direction of the arrow 23. Thus, there is produced on film P a sound track 38 which is of the variable density type but has otherwise the same characteristics as the variable area sound track S on the negative film N (Fig. 4) from which it is being printed.

In order to form light spot 31 in the plane of film P, there is formed in the plane of film N a uniformly illuminated rectangular light spot 17 (Fig. 4). The plane of film N is, like the plane of film P, a plane at right angles to the optical axis of the system, and light spot 17 is formed therein by the conventional arrangement consisting of lamp filament 10, condenser lens 12, screen 15 with rectangular opening 16, and spherical lens 13 (Figs. 1 to 3). Light spot 17 is on sound track S when film N moves vertically through its plane, as indicated in Fig. 1 by the arrow 22, and hence is more or less obscured by the opaque portion O of sound track S (Fig. 4).

Light spot 17 as obscured by portion O is imaged in the plane of film P by the cylindrical lens 30 whose cylinder axis is horizontal, and which hence acts in only the vertical plane. Since, furthermore, cylindrical lens 30 is the sole means in the optical system of Figs. 1 and 2 forming an image of light spot 17 in the plane of film P, the light flux emanating from light spot 17 is treated differently in the two co-ordinate planes: In the vertical plane, the light flux is focused by cylindrical lens 30 at the plane of film P while, in the horizontal plane, it is permitted to diverge so that it is diffused at that position (Figs. 1 and 2). This kind of imagery of light spot 17 results in the formation, in the plane of film P, of the light spot 31 of vertically varying illumination.

More particularly, light spot 17 as obscured by portion O may be considered as being composed of a large number of horizontal levels whose illumination is uniform. These horizontal levels are equal in their very small vertical extension, or height, but vary in horizontal extension, or length, in accordance with the variation in width of the transparent portion T of sound track S (Fig. 4). The horizontal levels of light spot 17 are imaged in the plane of film P by the action of cylindrical lens 30 in the vertical plane, and thus there is formed in the plane of film P a corresponding horizontal level for each horizontal level of light spot 17.

But, because of their divergence in the horizontal plane, the light fluxes passing through the individual horizontal levels of light spot 17 are diffused, that is, spread out, over about equal lengths in the plane of film P. This is true not only when each horizontal level of light spot 17 is considered as a whole, but also when it is considered point by point. That is to say, the light flux passing through an individual horizontal level of light spot 17 is spread out in the plane of film P in such a manner that the light flux passing through one point on this level is spread out over about the same length as the light flux passing through another point thereon.

The horizontal levels formed in the plane of film P thus are of about equal length irrespective of the difference in length of the horizontal levels of light spot 17 to which they correspond. The amounts of light flux, on the other hand, spread out over the individual horizontal levels in the plane of film P are substantially equal to the amounts of light flux passing through the corresponding horizontal levels of light spot 17. The horizontal levels in the plane of film P which correspond to the shorter horizontal levels of light spot 17 consequently have less illumination than those which correspond to the longer ones.

This difference in illumination of the horizontal levels in the plane of film P is a linear function of the difference in length of the horizontal levels of light spot 17 because the latter levels are of uniform illumination, and hence each point on every one of them contributes the same amount of light flux to the illumination of the entire length of the corresponding level in the plane of film P. Since, furthermore, the length of the horizontal levels of light spot 17 varies in accordance with the width of portion T, the illumination of light spot 31, which consists of the horizontal levels in the plane of film P, varies vertically in linear relation to the width of portion T. Since, finally, the exposure of film P is at a given instant during the printing operation substantially equal to the amount of light flux passing at this instant through light spot 31, it is likewise a linear function of the width of portion T when the uniformly illuminated rectangular light spot 17 is formed in the plane of film N of the optical system of Figs. 1 and 2.

However, as has been pointed out hereinbefore, it is at times desirable that the exposure of film P in the optical system of Figs. 1 and 2 be a non-linear function of the width of portion T, the character of the non-linearity of this function depending upon the particular requirements of a given actual case. According to the present invention, non-linear relationships of any desired character between the width of portion T and the exposure of film P are established in the optical system of Figs. 1 and 2 by varying the illumination of the light spot in the plane of film N in appropriate relation to its horizontal extension. The light spot of horizontally varying illumination thus formed in the plane of film N may, for example, have the appearance of the light spot 18 shown in Fig. 6. Light spot 18 is so positioned in the plane of film N that it is on sound track S when film N moves vertically through its plane, and hence is more or less obscured by the opaque portion O of sound track S.

The amount of light flux passing through light spot 18 as obscured by portion O is a function of the product of two variables, namely, the illumination of light spot 18 and the width of portion T. Since it varies in a horizontal direction, the illumination of light spot 18 is related to the width of portion T in the same manner as to the horizontal extension of light spot 18. The one of the two variables referred to above, namely, the illumination of light spot 18, thus is a function of the other variable, namely, the width of portion T, so that the amount of light flux passing through light spot 18 as obscured by portion O is a non-linear function of that width. By varying, therefore, the illumination of light spot 18 in appropriate relation to its horizontal extension, and hence the width of portion T, any desired non-linear relationship may be established in the optical system of Figs. 1 and 2 between the width of portion T and the amount of light flux passing through light spot 18 as obscured by portion O. The same non-linear relationship then is established between the width of portion T and both the vertical variation in illumination of light spot 31 and the exposure of film P. If, for example, the illumination of light spot 18 varies in linear relation to its horizontal extension, the amount of light flux passing through light spot 18 as obscured by portion O, the vertical variation in illumination of light spot 31, and the exposure of film P, all are second degree functions of the width of portion T. This result may be explained by the following considerations:

When it is obscured by portion O light spot 18, like light spot 17, may be considered as being composed of a large number of horizontal levels whose length varies in accordance with the width of portion T. For each of these levels there is formed in the plane of film P a corresponding horizontal level by the action of cylindrical lens 30 in the vertical plane. The horizontal levels in the plane of film P are again of about equal length, and the individual amounts of light flux spread out over them are again substantially equal to the individual amounts of light flux passing through the horizontal levels of light spot 18 to which they correspond. The vertical variation in illumination of light spot 31, which is composed of the horizontal levels in the plane of film P, thus is non-linearly related to the width of portion T in the same manner as the total amount of light flux passing through light spot 18 as obscured by portion O is non-linearly related thereto. So is the exposure of film P since it, in its turn, is substantially equal to the total amount of light flux passing through light spot 31.

Finally, since the light fluxes passing through the individual points on the horizontal levels of light spot 18 all are spread out over the entire length of the corresponding horizontal levels in the plane of film P, the illumination of light spot 31 does not vary horizontally notwithstanding the fact that the illumination of light spot 18 varies in a horizontal direction. Light spot 31 has, therefore, the general appearance given to it in Fig. 5 also when it is the image of a light spot of horizontally varying illumination.

One way of forming in the plane of film N of the optical system of Figs. 1 and 2 a light spot of horizontally varying illumination such as light spot 18 consists in placing the horizontally graded light shading member 19 (Fig. 7) adjacent to screen 15 as shown, by way of example, in Figs. 1 and 2. By giving to shading member 19 an appropriate relation between its light absorption and its horizontal extension, the illumination of the rectangular light spot formed in the plane of film N by the arrangement described hereinabove may be varied horizontally so as to establish any desired non-linear relationship between the width of portion T and the amount of light flux passing through the light spot as obscured by portion O, and hence the exposure of film P. Methods for giving to shading member 19 appropriate absorption characteristics are disclosed, for example, in British Specification 485,637 (Radio Corporation of America).

The employment, however, of shading members of horizontally varying light absorption, such as shading member 19, is not entirely satisfactory because, with any method of manufacturing them, difficulties are encountered in making their absorption characteristics so accurate as to vary the illumination of the light spot in the plane of film N with the exactness required for effectively achieving the objects of the present invention. These difficulties are avoided, and the illumination of the light spot in the plane of film N is varied horizontally with any desired degree of exactness, in a presently preferred embodiment of the invention which will now be described in more detail. In the preferred embodiment, the light spot of horizontally varying illumination is formed in the plane of film N by suitably imaging therein the light source of the printing optical system and an opening of suitable shape. An arrangement performing the imagery required for thus forming the light spot of horizontally varying illumination is incorporated, by way of example, in the optical system of Figs. 8 and 9. This optical system is identical with the optical system of Figs. 1 and 2 in the part between the plane of film N and the plane of film P. In the part between incandescent lamp 11 and the plane of film N, however, the illumination of sound track S is effected in the optical system of Figs. 8 and 9 as follows:

In the vertical plane (Fig. 8), an enlarged image of the vertical extension, or height, of lamp filament 10 is formed in the plane of film N by the action of condenser lens 26. This image is an illuminated area having straight and parallel horizontal edges. The action of condenser lens 26 is the only imaging action in the vertical plane since the cylindrical lens 27, which is placed between the screen 28 and the plane of film N, has its cylinder axis vertical and hence does not act in the vertical plane. By its action in the horizontal plane (Fig. 9), cylindrical lens 27 which is preferably well corrected for spherical and chromatic aberration, forms in the plane of film N an image of an opening in screen 28, which opening is uniformly illuminated by light flux from lamp filament 10. The image of the opening is an illuminated area having no distinct horizontal boundaries but straight and parallel vertical edges which are the images of the two straight and parallel vertical edges of the opening. Since, however, the image of the opening coincides with the image of the height of lamp filament 10 formed in the plane of film N by the action of condenser lens 26 in the vertical plane, the resultant compound image is a rectangular illuminated area having well defined horizontal and vertical edges. The whole arrangement is adjusted so that the compound image is on sound track S when film N moves vertically through its plane.

The shape of the opening in screen 28 is such that its height, that is, the distance of its two horizontal edges from one another, varies. The illumination of the compound image in the plane of film N therefore varies in a horizontal direction so that the compound image is a light spot of horizontally varying illumination such as light spot 18. This result is due to the fact that cylindrical lens 27 acts in only the horizontal plane, and that it is the sole means in the optical system of Figs. 8 and 9 forming an image of the opening in screen 28 in the plane of film N. The light flux passing through the opening in screen 28 thus is treated differently in the two co-ordinate planes: In the horizontal plane, the light flux is focused by cylindrical lens 27 at the plane of film N (Fig. 9) while, in the vertical plane, it is permitted to diverge so that it is diffused at that position (Fig. 8).

This kind of imagery of a uniformly illuminated opening whose height varies, results in a horizontally varying illumination of the compound image in the plane of film N for substantially the same reasons for which the imagery, by cylindrical lens 30, of light spot 17, or light spot 18, as obscured by portion O results in the vertically varying illumination of light spot 31, to wit:

A uniformly illuminated opening of varying height may be considered as being composed of a large number of vertical levels whose illumination is uniform. These vertical levels are equal in their very small horizontal extension, or width, but vary in vertical extension, or length, in accordance with the variation in height of the opening. They are imaged in the plane of film N by the action of cylindrical lens 27 in the horizontal plane, and thus there is formed in the plane of film N a corresponding vertical level for each vertical level of the opening.

But, because of their divergence in the vertical plane, the light fluxes passing through the individual vertical levels of the opening are diffused, that is, spread out, over equal lengths in the plane of film N. These lengths are determined by the uniform vertical extension, or height, of the image of the height of lamp filament 10 formed in the plane of film N by the action of condenser lens 26 in the vertical plane, which action at the same time evenly distributes the individual light fluxes vertically. The vertical levels formed in the plane of film N thus are of equal length irrespective of the difference in length of the vertical levels of the opening to which they correspond. The amounts of light flux, on the other hand, evenly spread out over the individual vertical levels in the plane of film N are substantially equal to the amounts of light flux passing through the corresponding vertical levels of the opening. The vertical levels in the plane of film N which correspond to the shorter vertical levels of the opening consequently have less illumination than those which correspond to the longer ones.

This difference in illumination of the vertical levels in the plane of film N is a linear function of the difference in length of the vertical levels of the opening since the latter levels are of uniform illumination. Since, furthermore, the length of the vertical levels of the opening varies in accordance with the height of the opening, the illumination of the compound image which is composed of the vertical levels in the plane of film N, varies horizontally in linear relation to the height of the opening. If, therefore, the height of the opening varies in a certain relation to its distance from one of the two vertical edges of the opening, the illumination of the compound image varies in the same relation to the horizontal extension thereof, and also to the width of portion T.

It will thus be seen that by appropriately varying the height of the opening in screen 28 the illumination of the compound image formed in the plane of film N of the optical system of Figs. 8 and 9 may be varied in any desired relation to the horizontal extension thereof. If, for example, it is desired to establish a linear relation between the illumination and the horizontal extension of the compound image, there must be provided in screen 28 the opening 70 shown in Fig. 10. Opening 70 has a straight edge 71 which extends slantwise in a horizontal direction so as to be inclined with respect to the straight and parallel vertical edges 72 and 73 of opening 70, and to point upward from edge 72 to edge 73. The straight horizontal edge 74 of opening 70, on the other hand, is perpendicular to vertical edges 72 and 73. The distance of horizontal edges 71 and 74 from one another, that is, the height of opening 70, therefore varies in linear relation to its distance from vertical edge 72, and in such a manner that it increases when this distance increases.

Thus, when opening 70 is in screen 28, a linear relation is established between the illumination and the horizontal extension of the compound image. Furthermore, screen 28 is adjusted so that the image of vertical edge 72, which is formed in the plane of film N by the action of cylindrical lens 27 in the horizontal plane, coincides with the vertical boundary 52 of sound track S when film N moves vertically through its plane; compare Fig. 6. The compound image then is on sound track S so that the illumination of the vertical levels composing it increases in linear relation to their distance from vertical boundary 52. The amount of light flux passing through the compound image as obscured by portion O therefore is in this case a second degree function of the width of portion T, and the rate of change of the light flux increases with the increase in width of portion T.

A linear relation between the illumination and the horizontal extension of the compound image is established also when opening 70 is bounded by the inclined edge 76 instead of inclined edge 71, as indicated in Fig. 10 by the dot-and-dash lines 76 and 77. Inclined edge 76 is again straight but points, in contradistinction to inclined edge 71, downward from vertical edge 72 to vertical edge 73. While, therefore, the height of opening 70 varies again in linear relation to its distance from vertical edge 72, it now decreases when this distance increases. Thus, if screen 28 is adjusted as described in the preceding paragraph, the illumination of the vertical levels composing the compound image now decreases in linear relation to their distance from vertical boundary 52. The amount of light flux passing through the compound image as obscured by portion O hence is in this case again a second degree function of the width of portion T, but the rate of change of the light flux now decreases when the width of portion T increases.

A second degree relation between the illumination and the horizontal extension of the compound image is established when there is provided in screen 28 the opening 80 shown in Fig. 11. Opening 80 has a curved edge 81 whose curvature is of a parabolic character. Curved edge 81 extends horizontally from the vertical edge 82 of opening 80 to the vertical edge 83 thereof in such a manner that its slope increases as it approaches edge 83. The straight horizontal edge 84 of opening 80, on the other hand, is perpendicular to the straight and parallel vertical edges 82 and 83. The distance of horizontal edges 81 and 84 from one another, that is, the height of opening 80, therefore varies in a second degree relation to its distance from vertical edge 82, and in such a manner that it increases when this distance increases.

Thus, when opening 80 is in screen 28, a second degree relation is established between the illumination and the horizontal extension of the compound image. Furthermore, screen 28 is adjusted so that the image of vertical edge 82, which is formed in the plane of film N by the action of cylindrical lens 27 in the horizontal plane, coincides with the vertical boundary 52 of sound track S when film N moves vertically through its plane. The compound image then is on sound track S so that the illumination of the vertical levels composing it increases in a second degree relation to their distance from vertical boundary 52. The amount of light flux passing through the compound image as obscured by portion O therefore is in this case a third degree function of the width of portion T, and the rate of change of the light flux increases with the increase in width of portion T.

A second degree relation between the illumination and the horizontal extension of the compound image is established also when opening 80 is bounded by the curved edge 86 instead of curved edge 81, as indicated in Fig. 11 by the dot-and-dash lines 86 and 87. Curved edge 86 is again a parabola but, in contradistinction to curved edge 81, its slope decreases as it approaches vertical edge 83. While, therefore, the height of opening 80 varies again in a second degree relation to its distance from vertical edge 82, it now decreases when this distance increases. Thus, if screen 28 is adjusted as described in the preceding paragraph, the illumination of the vertical levels composing the compound image now decreases in a second degree relation to their distance from vertical boundary 52. The amount of light flux passing through the compound image as obscured by portion O hence is in this case again a third degree function of the width of portion T, but the rate of change of the light flux now decreases when the width of portion T increases.

When opening 70 and opening 80, respectively, are in screen 28, the rate of change of the light flux passing through the compound image as obscured by portion O either continuously increases—in case opening 70 is bounded by inclined edge 71, and opening 80 by curved edge 81—or continuously decreases—in case opening 70 is bounded by inclined edge 76, and opening 80 by curved edge 86—when the width of portion T increases. But the height of the opening in screen 28 may also vary so that the rate of change of the light flux partly increases and partly decreases, or vice versa, when the width of portion T increases. An opening whose height varies in this manner is the opening 70a shown in Fig. 12 as bounded by either inclined edge 78 or inclined edge 79. Another example of such an opening is the opening 80a shown in Fig. 13 as bounded by either curved edge 88 or curved edge 89, the curvature of edges 88 and 89 being of a parabolic character. When openings 70a and 80a are bounded by edges 78 and 88, respectively, the rate of change of the light flux first increases, and then decreases, when the width of portion T increases. When, on the othehr hand, openings 70a and 80a are bounded by edges 79 and 89, respectively, the rate of change of the light flux first decreases, and then increases, when the width of portion T increases; it being assumed that the images of vertical edges 72 and 82 of openings 70a and 80a, respectively, are made to coincide with vertical boundary 52 in each of these four cases.

Openings 70 and 70a (Figs. 10 and 12) are horizontally bounded by edge 74 which is straight and perpendicular to vertical edges 72 and 73, and by inclined edges 71 or 76, and 78 or 79, respectively. Since inclined edges 71, 76, 78, and 79, are straight throughout their entire lengths, the height of openings 70 and 70a varies entirely in linear relation to its distance from vertical edge 72 of openings 70 and 70a so that the relation between the illumination and the horizontal extension of the compound image is entirely of a linear character when openings 70 and 70a are in screen 28. The relationship between the width of portion T and the amount of light flux passing through the compound image as obscured by portion O, and hence the vertical variation in illumination of light spot 31 and the exposure of film P, therefore is entirely of a second degree character in the case of openings 70 and 70a.

Openings 80 and 80a (Figs. 11 and 13), on the other hand, are horizontally bounded by edge 84 which is straight and perpendicular to vertical edges 82 and 83, and by curved edges 81 or 86, and 88 or 89, respectively. Since the curvature of edges 81, 86, 88, and 89, is parabolic throughout their entire lengths, the height of openings 80 and 80a varies entirely in a second degree relation to its distance from vertical edge 82 of openings 80 and 80a so that the relation between the illumination and the horizontal extension of the compound image is entirely of a second degree character when openings 80 and 80a are in screen 28. The relationship between the width of portion T and the amount of light flux passing through the compound image as obscured by portion O, and hence the vertical variation in illumination of light spot 31 and the exposure of film P, therefore is entirely of a third degree character in the case of openings 80 and 80a.

But in addition to being bounded by a horizontal edge which is straight and perpendicular to its two straight and parallel vertical edges, the opening in screen 28 may also be bounded by a horizontal edge whose contour is in part straight and inclined, and in part parabolic. The height of the opening then varies partly in linear relation, and partly in a second degree relation, to its distance from one of the two vertical edges of the opening so that the relation between the illumination and the horizontal extension of the compound image is partly of a linear, and partly of a second degree, character. In the case of this opening, therefore, the relationship between the width of portion T and the exposure of film P is partly of a second degree, and partly of a third degree, character. Moreover, any other complex character may be given to this relationship by shaping one of the two horizontal edges of the opening in screen 28 so as to establish an appropriate relation between the illumination and the horizontal extension of the compound image. For example, the horizontal edge 91 of the opening 90 shown in Fig. 14 is curved so that there is given to the relationship between the width of portion T and the exposure of film P a character which compensates for the non-linearity of the emulsion characteristic of film P. Curved edge 91 extends horizontally between the straight and parallel vertical edges 92 and 93 of opening 90, while the horizontal edge 94 of opening 90 is straight and perpendicular to vertical edges 92 and 93. The distance of horizontal edges 91 and 94 from one another, that is, the height of opening 90, therefore varies in a relation to its distance from vertical edge 92 which is indicated by the contour of edge 91.

The exact contour of curved edge 91 is determined by first determining that relationship between the width of portion T and the exposure of film P which results in a linear relationship between the width of portion T and the light transmission of the variable density sound track 38 after film P has been developed. This relationship between the width of portion T and the exposure of film P can be determined experimentally for any kind of film stock which is is desired to use as film P. The actual values found by experiment will differ for different kinds of film stock in accordance with their different emulsion characteristics, and for the same kind of film stock in accordance with its processing, but the resulting curve will in each case be of the general character represented by the curve Q in Fig. 15.

Horizontal edge 91 is now curved so that the height $h$ of opening 90 at a point R on edge 91 is linearly related to the slope of curve Q at the point U thereon, the distance W of point R from vertical edge 92 being equal to the abscissa of point U. The height of opening 90 then varies in such a relation to its distance from vertical edge 92, and the illumination of the compound image in such a relation to its horizontal extension, that the desired compensating character is given to the relationship between the width of portion T and the amount of light flux passing through the compound image as obscured by portion Q, and hence the exposure of film P. It is understood that, in order properly to achieve this end, the constant of proportionality between the height of opening 90 and the slope of curve Q must be chosen so that, under the conditions of the actual printing operation, the exposure of film P falls along curve Q and not along a curve parallel thereto. Furthermore, when opening 90 is provided in screen 28, screen 28 must be adjusted so that the image of vertical edge 92, which is formed in the plane of film N by the action of cylindrical lens 27 in the horizontal plane, coincides with the vertical boundary 52 of sound track S when film N moves vertically through its plane.

Thus, when opening 90 is provided in the screen 28 of the optical system of Figs. 8 and 9, the exposure of film P is a function of the width of portion T whose character is such that the light transmission of the variable density sound track 38 is linearly related to the width of portion I after film P has been developed. As has been pointed out hereinabove, this result is desirable if undistorted sound is to be reproduced directly from sound track 38. However, it may be desirable to establish also non-linear relationships between the width of portion T and the light transmission of the developed sound track 38. If, for example, the developed sound track 38 is to be printed from film P onto a film F (not shown), the light transmission of the developed variable density sound track thus produced on film F must be linearly related to the width of portion T in order to make possible the reproduction of sound therefrom without causing distortions due to the non-linearity of the emulsion characteristics of films P and F. This condition is satisfied when the relationship between the width of portion T and the light transmission of the developed sound track 38 is of a character which compensates for the non-linearity of the emulsion characteristics of films P and F. Such a compensating character may be given to that relationship also by shaping one of the two horizontal edges of the opening in screen 28 so as to establish, in the optical system of Figs. 8 and 9, an appropriate relation between the illumination and the horizontal extension of the compound image in the plane of film N.

The exact contour of this curved horizontal edge is determined again by two steps. First, there is determined experimentally the curve representing that relationship between the width of portion T and the exposure of film P which results in a non-linear relationship of the desired compensating character between the width of portion T and the light transmission of the developed sound track 38. Next, the horizontal edge is curved so that the height of the opening at a point $r$ on the edge is linearly related to the slope of the curve at the point $u$ thereon, the abscissa of point $u$ being equal to the distance of point $r$ from one of the two straight and parallel vertical edges of the opening. The height of the opening then varies in a relation from this vertical edge, and the illumination of the compound image in a relation to its horizontal extension, which establishes such a relationship between the width of portion T and the exposure of film P as to give the desired compensating character to the non-linear relationship between that width and the light transmission of the developed sound track 38. It is understood, that in order properly to achieve this end, the constant of proportionality between the height of the opening and the slope of the curve must be chosen so that, under the conditions of the actual printing operation, the exposure of film P falls along the aforementioned curve and not along a curve parallel thereto. Furthermore, when the opening now under discussion is provided in screen 28, screen 28 must be adjusted so that the image of the aforementioned vertical edge which is formed in the plane of film N by the action of cylindrical lens 27 in the horizontal plane, coincides with the vertical boundary 52 of sound track S when film N moves vertically through its plane. Finally, since the contours of the curve and the curved edge now under discussion are, in general, similar to the contours of curve Q and curved edge 91, reference is made to Figs. 14 and 15 by way of further explanation.

Throughout the foregoing description of the present invention it has been assumed that the variable area sound track S on film N is of the unilateral type as illustrated in Figs. 4 and 6. However, as has been pointed out in application Serial No. 449,798, the variable area sound track on film N which is to be converted into the variable density sound track 38 on film P by means of the printing optical systems of Figs. 1 and 2, and Figs. 8 and 9, respectively, may also be of the bilateral, or symmetrical, type. The symmetrical variable area sound track on film N may, for example, be an original negative such as sound track S, shown in Fig. 16. Sound track $S_1$ has its transparent portion divided by its opaque portion $O_1$ into two portions T' and T''. Portions T' and T'' extend from the vertical boundaries 102 and 103, respectively, of sound track $S_1$ towards its vertical center line $C_1$—$C_1$ so as to be symmetrical with respect thereto, and portion $O_1$ is likewise symmetrical about center line $C_1$—$C_1$. The entire sound track $S_1$ thus is symmetrical about its vertical center line $C_1$—$C_1$.

Alternatively, the symmetrical varible area sound track on film N may have been obtained by printing from a sound track such as sound track $S_1$, or directly recorded by means of the reversal method. In either case, it then has the appearance of the sound track $S_2$ shown in Fig. 17. Sound track $S_2$ has its opaque portion divided by its transparent portion $T_2$ into two portions O' and O''. Portion $T_2$ is symmetrical about the vertical center line $C_2$—$C_2$ of sound track $S_2$, and extends on both sides thereof towards the vertical boundaries 202 and 203, respectively, of sound track $S_2$. Portions O' and O'', in their turn, are bounded by vertical boundaries 202 and 203, respectively, and are likewise symmetrical with respect to center line $C_2$—$C_2$. The entire sound track $S_2$ thus is symmetrical about its vertical center line $C_2$—$C_2$.

When either symmetrical sound track $S_1$ or symmetrical sound track $S_2$ is on film N, the present invention is carried out as follows:

The illumination of the light spot formed in the plane of film N of the optical systems of Figs. 1 and 2, and Figs. 8 and 9, respectively, must not only be varied in the desired relation to the horizontal extension thereof, but this variation must also take place in the same sense, and at the same rate, on both sides of the vertical center line of the light spot. In other words, the illumination of the light spot must vary horizontally so as to be symmetrically distributed with respect to the vertical center line thereof. Furthermore, when film N, having thereon either symmetrical track $S_1$ or symmetrical track $S_2$, moves vertically through its plane, the vertical center line of the light spot must be in alignment with either center line $C_1$—$C_1$ or center line $C_2$—$C_2$ so that the illumination of the light spot is symmetrically distributed also with respect to this center line. Light spots of horizontally varying illumination which satisfy these conditions are the light spots 118 and 218 shown by way of example in Figs. 16 and 17, respectively.

As further shown in Figs. 16 and 17, respectively, light spots 118 and 218 are on symmetrical tracks $S_1$ and $S_2$, respectively, so as to be more or less obscured by portion $O_1$ and portions O' and O'', respectively, when film N moves vertically through its plane. Light spots 118 and 218 may then be considered as being composed of a large number of horizontal levels whose length varies in accordance with the width of portions T' and T'' and portion $T_2$, respectively. For each of these horizontal levels there is formed in the plane of film P a corresponding horizontal level by the action of cylindrical lens 30 in the vertical plane, and the horizontal levels in the plane of film P constitute again the light spot 31 of vertically varying illumination (Fig. 5).

It is understood that, while the horizontal levels of light spots 118 and 218 are undivided in case they are employed with symmetrical track $S_2$ whose opaque portion is divided by its transparent portion $T_2$ into the two portion O' and O'' (see Fig. 17), they are divided into two sections in case they are employed with symmetrical track $S_1$ whose transparent portion is divided by its opaque portion $O_1$ into the two portions T' and T'' (see Fig. 16). But, since the light flux passing through light spots 118 and 218 as obscured by portion $O_1$ is permitted to diverge in the horizontal plane, the light flux passing through the one section of a particular horizontal level thereof is spread out in the plane of film P over about the same length as the light flux passing through the other section of the same horizontal level. The light spot of vertically varying illumination formed in the plane of film P therefore has the general appearance given to light spot 31 in Fig. 5 also when light spots 118 and 218 are obscured by portion $O_1$.

It will thus be seen that the amount of light flux passing through light spots 118 and 218 as obscured by portion $O_1$, or portions O' and O'', is again a function of the product of the illumination of those light spots and the width of portions T' and T'', or portion $T_2$. Furthermore, on account of the fact that it is symmetrically distributed with respect to center line $C_1$—$C_1$, or center line $C_2$—$C_2$, the illumination of light spots 118 and 218 is related in the same manner as to the horizontal extension thereof also to the width of portions T' and T'', or portion $T_2$. The amount of light flux passing through light spots 118 and 218 as obscured by portion $O_1$, or portions O' and O'', therefore, is a non-linear function of that width. The character of this non-linear relationship is determined by the relation between the illumination and the horizontal extension of light spots 118 and 218, and a non-linear relationship of the same character is established between the width of portions T' and T'', or portion $T_2$, and both the vertical variation in illumination of light spot 31 and the exposure of film P.

Figure 7:
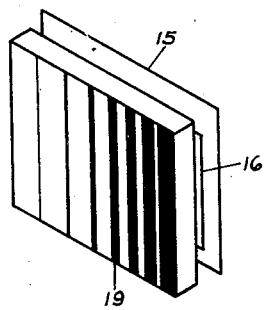
Fig. 7 is an enlarged perspective view of a light shading member employed in the optical system of Figs. 1 and 2.

Light spots of horizontally varying illumination such as light spots 118 and 218 may be formed in the plane of film N of the optical system of Figs. 1 and 2 by employing therewith light shading members of suitable absorption characteristics in the manner explained hereinabove with reference to the light shading member 19 of Fig. 7. Preferably, however, this type of light spot is formed in the plane of film N of the optical system of Figs. 8 and 9 by providing in the screen 28 thereof an opening whose height varies in the same sense, and at the same rate, on both sides of the vertical center line of the opening so that the opening is symmetrical about its vertical center line. When such an opening is provided in screen 28, the illumination of the compound image which is formed in the plane of film N of the optical system of Figs. 8 and 9, is symmetrically distributed with respect to the vertical center line of the compound image, the relation in which it varies to the horizontal extension of the compound image being the same as the relation in which the height of the opening varies to its distance from the vertical center line of the opening. Furthermore, screen 28 is adjusted so that the vertical center line of the opening is conjugate to center line $C_1$—$C_1$ or center line $C_2$—$C_2$, with respect to cylindrical lens 27 when film N, having thereon symmetrical track $S_1$, or symmetrical track $S_2$, moves vertically through its plane. The compound image then is on symmertical track $S_1$, or symmetrical track $S_2$, and hence more or less obscured by portion $O_1$, or portions $O'$ and $O''$, and its vertical center line is in alignment with center line $C_1$—$C_1$, or center line $C_2$—$C_2$, so that its illumination is symmetrically distributed also with respect to this center line.

An opening whose height varies in the same sense, and at the same rate, on both sides of its vertical center line is the opening 170 shown by way of example in Fig. 18. Opening 170 has a V-shaped edge 171 which extends horizontally between the straight and parallel vertical edges 172 and 173 of opening 170. The two straight legs of edge 171 are inclined at the same angle with respect to edges 172 and 173, respectively, so as to point upward from these edges, and the apex of edge 171 is on the vertical center line 175—175 of opening 170. The straight horizontal edge 174 of opening 170, on the other hand, is perpendicular to vertical edges 172 and 173 so that opening 170 is symmetrical about center line 175—175. The distance of horizontal edges 171 and 174 from one another, that is, the height of opening 170, therefore varies in linear relation to its distance from vertical edges 172 and 173, respectively, and in such a manner that it increases at the same rate on both sides of center line 175—175 when its distance from those edges increases. In other words, the height of opening 170 varies in linear relation to its distance from center line 175—175, and in such a manner that it decreases at the same rate on both sides of center line 175—175 as its distance therefrom increases.

Thus, when opening 170 is in screen 28, the illumination of the compound image is symmetrically distributed with respect to the vertical center line of the compound image in such a manner that it varies in linear relation to the horizontal extension of the compound image. More particularly, the illumination of the vertical levels composing the compound image varies as a linear function of their distance from the vertical center line of the compound image, and in such a manner that it decreases at the same rate on both sides of this center line as the distance of the levels therefrom increases; compare light spot 118.

As has been pointed out hereinabove, screen 28 is adjusted so that center line 175—175 of opening 170 is conjugate to center line $C_1$—$C_1$, or center line $C_2$—$C_2$, with respect to cylindrical lens 27 when film N, having thereon symmetrical track $S_1$, or symmetrical track $S_2$, moves vertically through its plane. The compound image then is on symmetrical track $S_1$, or symmetrical track $S_2$, and its vertical center line is in alignment with center line $C_1$—$C_1$, or center line $C_2$—$C_2$. The illumination of the vertical levels composing the compound image hence varies as a linear function also of their distance from center line $C_1$—$C_1$, or center line $C_2$—$C_2$, and in such a manner that it decreases at the same rate on both sides of this center line as the distance of the levels therefrom increases; compare Fig. 16. The amount of light flux passing through the compound image as obscured by portion $O_1$, or portions $O'$ and $O''$, therefore is in this case a second degree function of the width of portions $T'$ and $T''$, or portion $T_2$. So is the exposure of film P. But the rate of change of the light flux, and of the exposure of film P, increases with the increase in width of portions $T'$ and $T''$, while it decreases when the width of portion $T_2$ increases.

Another opening whose height varies in the same sense, and at the same rate, on both sides of its vertical center line, is the opening 270 shown in Fig. 19 by way of further example. Opening 270 has a V-shaped edge 271 which extends horizontally between the straight and parallel vertical edges 272 and 273 of opening 270. The two straight legs of edge 271 are inclined at the same angle with respect to edges 272 and 273, respectively, so as to point downward from these edges, and the vertex of edge 271 is on the vertical center line 275—275 of opening 270. The straight horizontal edge 274 of opening 270, on the other hand, it perpendicular to vertical edges 272 and 273 so that opening 270 is symmetrical about center line 275—275. The distance of horizontal edges 271 and 274 from one another, that is, the height of opening 270, therefore varies in linear relation to its distance from vertical edges 272 and 273, respectively, and in such a manner that it decreases at the same rate on both sides of center line 275—275 when its distance from those edges increases. In other words, the height of opening 270 varies in linear relation to its distance from center line 275—275, and in such a manner that it increases at the same rate on both sides of center line 275—275 as its distance therefrom increases.

Thus, when opening 270 is in screen 28, the illumination of the compound image is again symmetrically distributed with respect to the vertical center line of the compound image in such a manner that it varies in linear relation to the horizontal extension of the compound image. Also the illumination of the vertical levels composing the compound image varies again as a linear function of their distance from the vertical center line of the compound image, but it now varies in such a manner that it increases at the same rate on both sides of this center line as the distance of the levels therefrom increases; compare light spot 218.

Screen 28 is adjusted so that center line 275—275 of opening 270 is conjugate to center line $C_1$—$C_1$, or center line $C_2$—$C_2$, with respect to cylindrical lens 27 when film N, having thereon symmetrical track $S_1$, or symmetrical track $S_2$, moves vertically through its plane. The compound image then is on symmetrical track $S_1$, or symmetrical track $S_2$, and its vertical center line is in alignment with center line $C_1$—$C_1$, or center line $C_2$—$C_2$. The illumination of the vertical levels composing the compound image hence varies as a linear function also of their distance from center line $C_1$—$C_1$, or center line $C_2$—$C_2$, and in such a manner that it increases at the same rate on both sides of this center line as the distance of the levels therefrom increases; compare Fig. 17. The amount of light flux passing through the compound image as obscured by portion $O_1$, or portions $O'$ and $O''$, therefore is in this case again a second degree function of the width of portions $T'$ and $T''$, or portion $T_2$. So is the exposure of film P. But the rate of change of the light flux, and of the exposure of film P, now decreases when the width of portions $T'$ and $T''$ increases, while it increases with the increase in width of portion T₂.

Thus, by providing in screen 28 opening 170 when symmetrical sound track S₁ is on film N, or opening 270 when symmetrical sound track S₂ is on film N, the same relationship may be established between the width of the transparent portion of the variable area sound track and the amount of light flux passing through the compound image as obscured by its opaque portion, and hence the exposure of film P, as by providing in screen 28 opening 70 bounded by inclined edge 71 (Fig. 10) when unilateral sound track S is on film N. Also, by providing in screen 28 opening 270 when symmetrical track S₁ is on film N, or opening 170 when symmetrical track S₂ is on film N, the same relationship may be established as by providing in screen 28 opening 70 bounded by inclined edge 76 (Fig. 10) when unilateral track S is on film N. That is to say, openings 170 and 270 are adaptations of opening 70, bounded by either inclined edge 71 or inclined edge 76, for use with the symmetrical tracks S₁ and S₂ respectively. In like manner, the openings 180, 280, 170a, 180a, 190 and 290, shown in Figs. 20 to 25, are adaptations for such use of the opening 80 as bounded by either curved edge 81 or curved edge 86 (Fig. 11), the opening 70a (Fig. 12), the opening 80a (Fig. 13), and the opening 90 (Fig. 14), respectively. Openings 180, 280, 170a, 180a, 190, and 290, are symmetrical about their vertical center lines 185—185, 285—285, 175a—175a, 185a—185a, 195—195, and 295—295 respectively. When, therefore, any one of these openings is provided in screen 28, the illumination of the compound image is symmetrically distributed with respect to the vertical center line of the compound image, the law governing this distribution depending upon the manner in which the height of the opening varies in relation to its distance from the vertical center line of the opening.

For example, opening 180 (Fig. 20) is bounded horizontally by the curved edge 181, and by the straight edge 184 which is perpendicular to the straight and parallel vertical edges 182 and 183 of opening 180. The curvature of edge 181 is of a parabolic character on both sides of center line 185—185, and parabolic edge 181 is disposed so that its slope increases as it approaches center line 185—185. The distance of horizontal edges 181 and 184 from one another, that is, the height of opening 180, therefore varies in a second degree relation to its distance from vertical edges 182 and 183, respectively, and in such a manner that it increases at the same rate on both sides of center line 185—185 when its distance from those edges increases. In other words, the height of opening 180 varies in a second degree relation to its distance from center line 185—185, and in such a manner that it decreases at the same rate on both sides of center line 185—185 as its distance therefrom increases. When opening 180 is in screen 28, the illumination of the compound image therefore varies in a second degree relation to the horizontal extension of the compound image. More particularly, the illumination of the vertical levels composing the compound image varies as a second degree function of their distance from the vertical center line of the compound image, and in such a manner that it decreases at the same rate on both sides of this center line as the distance of the levels therefrom increases.

Furthermore, opening 280 (Fig. 21) is bounded horizontally by the curved edge 281, and by the straight edge 284 which is perpendicular to the straight and parallel vertical edges 282 and 283 of opening 280. The curvature of edge 281 is of a parabolic character on both sides of center line 285—285, and parabolic edge 281 is disposed so that its slope decreases as it approaches center line 285—285. The distance of horizontal edges 281 and 284 from one another, that is, the height of opening 280, therefore varies in a second degree relation to its distance from vertical edges 282 and 283, respectively, and in such a manner that it decreases at the same rate on both sides of center line 285—285 when its distance from those edges increases. In other words, the height of opening 280 varies in a second degree relation to its distance from center line 285—285, and in such a manner that it increases at the same rate on both sides of center line 285—285 as its distance therefrom increases. When opening 280 is in screen 28, the illumination of the compound image therefore varies again in a second degree relation to the horizontal extension of the compound image. Also, the illumination of the vertical levels composing the compond image varies again as a second degree function of their distance from the vertical center line of the compound image, but it now varies in such a manner that it increases at the same rate on both sides of this center line as the distance of the levels therefrom increases.

When center lines 185—185 or 285—285 are conjugate to center lines C₁—C₁ or C₂—C₂ with respect to cylindrical lens 27, the compound image is on symmetrical tracks S₁ or S₂, its vertical center line being in alignment with center lines C₁—C₁ or C₂—C₂. The amount of light flux passing through the compound image as obscured by portion O₁, or portions O' and O'', then is in each case a third degree function of the width of portions T' and T'', or portion T₂. So is the exposure of film P. But when opening 180 is employed in conjunction with symmetrical track S₁, and opening 280 in conjunction with symmetrical track S₂, the rate of change of the light flux, and of the exposure of film P, increases with the increase in width of portions T' and T'' and portion T₂, respectively, while when opening 280 is employed in conjunction with symmetrical track S₁, and opening 180 in conjunction with symmetrical track S₂, the rate of change of the light flux, and of the exposure of film P, decreases when the width of portions T' and T'' and portion T₂, respectively, increases.

Moreover, opening 170a (Fig. 22) is bounded horizontally by either the inclined edge 178 or the inclined edge 179, and by the straight edge 174a which is perpendicular to the straight and parallel vertical edges 172a and 173a of opening 170a. Since opening 170a is symmetrical about its vertical center line 175a—175a, and since inclined edges 178 and 179 are straight throughout their entire lengths, the height of opening 170a varies on both sides of center line 175a—175a at the same rate and in linear relation to its distance from center line 175a—175a as well as from vertical edges 172a and 173a, respectively. When opening 170a is in screen 28, the illumination of the compound image therefore varies on both sides of the vertical center line of the compound image at the same rate and again in linear relation to the horizontal extension of the compound image, and when center line 175a—175a is conjugate to center lines C₁—C₁ or C₂—C₂ with respect to cylindrical lens 27, the amount of light flux passing through the compound image as obscured by portion O₁, or portions O' and O'', is again a second degree function of the width of portions T' and T'', or portion $T_2$.

Similarly, opening 180a (Fig. 23) is bounded horizontally by either the curved edge 188 or the curved edge 189, and by the straight edge 184a which is perpendicular to the straight and parallel vertical edges 182a and 183a of opening 180a. Since opening 180a is symmetrical about its vertical center line 185a—185a, and since the curvature of edges 188 and 189 is parabolic throughout their entire lengths, the height of opening 180a varies on both sides of center line 185a—185a at the same rate and in a second degree relation to its distance from center line 185a—185a as well as from vertical edges 182a and 183a, respectively. When opening 180a is in screen 28, the illumination of the compound image therefore varies on both sides of the vertical center line of the compound image at the same rate and again in a second degree relation to the horizontal extension of the compound image, and when center line 185a—185a is conjugate to center lines $C_1$—$C_1$ or $C_2$—$C_2$ with respect to cylindrical lens 27, the amount of light flux passing through the compound image as obscured by portion $O_1$, or portions O' and O'', is again a third degree function of the width of portions T' and T'', or portion $T_2$.

But, when opening 170a is bounded by inclined edge 178, and opening 180a by parabolic edge 188, the height of these openings first increases, and then decreases, as its distance from center line 175a—175a and center line 185a—185a, respectively, increases so that the illumination of the vertical levels composing the compound image first increases, and then decreases, as their distance from the vertical center line of the compound image increases. Consequently, the rate of change of the light flux first increases, and then decreases, as the width of portions T' and T'', or portion $T_2$ increases. Conversely, when opening 170a is bounded by inclined edge 179, and opening 180a by parabolic edge 189—as indicated by the dot-and-dash lines in Figs. 22 and 23—the height of these openings first decreases, and then increases, as its distance from center line 175a—175a and center line 185a—185a, respectively, increases so that the illumination of the vertical levels composing the compound image first decreases, and then increases as their distance from the vertical center line of the compound image increases. Consequently, the rate of change of the light flux first decreases, and then increases, as the width of portions T' and T'', or portion $T_2$, increases.

Finally, opening 190 (Fig. 24) is bounded horizontally by the curved edge 191, and by the straight edge 194 which is perpendicular to the straight and parallel vertical edges 192 and 193 of opening 190. Similarly, opening 290 (Fig. 25) is bounded horizontally by the curved edge 291, and by the straight edge 294 which is perpendicular to the straight and parallel vertical edges 292 and 293 of opening 290. The exact contours of curved edges 191 and 291 are determined essentially in the manner described hereinabove in connection with Figs. 14 and 15 for the curved edge 91 of opening 90. That is to say, after curve Q has been determined by experiment, horizontal edge 191 is curved so that a linear relationship is established between the slope of curve Q at the point U thereon and the height $h$ of opening 190 at the two points R' and R'' which are positioned on edge 191 so as to be symmetrical with respect to the vertical center line 195—195 of opening 190, and whose distance $w/2$ from the vertical edges 192 and 193, respectively, is equal to half the abscissa of point U. Opening 190 thus is symmetrical about center line 195—195, and curved edge 191 is so disposed with respect to center line 195—195 that the length thereof is equal to the value of $h$ for the maximum width of portions T' and T''. The height of opening 190 then varies in such a relation to its distance from vertical edges 192 to 193, respectively, and the illumination of the compound image in such a relation to its horizontal extension, that there is given to the relationship between the width of portions T' and T'' and the amount of light flux passing through the compound image as obscured by portion $O_1$, and hence the exposure of film P, a character which compensates for the non-linearity of the emulsion characteristic of film P. It is understood that, in order properly to achieve this end, the constant of proportionality between the height of opening 190 and the slope of curve Q must be chosen so that, under the conditions of the actual printing operation, the exposure of film P falls along curve Q and not along a curve parallel thereto. Furthermore, when opening 190 is provided in screen 28, screen 28 must be adjusted so that center line 195—195 is conjugate to center line $C_1$—$C_1$ with respect to cylindrical lens 27 as film N, having thereon symmetrical track $S_1$, moves vertically through its plane.

Horizontal edge 291, on the other hand, is curved so that a linear relationship is established between the slope of curve Q at the point U thereon and the height $h$ of opening 290 at the two points R' and R'' which are positioned on edge 291 so as to be symmetrical with respect to the vertical center line 295—295 of opening 290, and whose distance $w/2$ from center line 295—295 is equal to half the abscissa of point U. Opening 290 thus is symmetrical about center line 295—295, and curved edge 291 is so disposed with respect to center line 295—295 that the length thereof is equal to the value of $h$ for the zero width of portion $T_2$. The height of opening 290 then varies in such a relation to its distance from center line 295—295, and the illumination of the compound image in such a relation to its horizontal extension, that the compensating character described in the preceding paragraph is given to the relationship between the width of portion $T_2$ and the amount of light flux passing through the compound image as obscured by portions O' and O'', and hence the exposure of film P. It is understood that, in order properly to achieve this end, the constant of proportionality between the height of opening 290 and the slope of curve Q must be chosen so that, under the conditions of the actual printing operation, the exposure of film P falls along curve Q and not along a curve parallel thereto. Furthermore, when opening 290 is provided in screen 28, screen 28 must be adjusted so that center line 295—295 is conjugate to center line $C_2$—$C_2$ with respect to cylindrical lens 27 as film N, having thereon symmetrical track S, moves vertically through its plane.

Thus, when opening 190 is provided in the screen 28 of the optical system of Figs. 8 and 9, the exposure of film P is a function of the width of portions T' and T'' whose character is such that the light transmission of the variable density sound track 38 is linearly related to the width of portions T' and T'' after film P has been developed. Correspondingly, when opening 290 is provided in screen 28, the exposure of film P is a function of the width of portion $T_2$ whose character is such that the light transmission of the developed sound track 38 is linearly related to the width of portion $T_2$. However, by providing in screen 28 openings of appropriately varying heights, the light transmission of the developed sound track 38 may also be made a non-linear function of the width of portions T' and T'', or portion $T_2$, and particularly a non-linear function whose character is such that, when the developed variable density sound track 38 is printed from film P onto a film F (not shown), the light transmission of the developed variable density sound track thus produced on film F is linearly related to the width of portions T' and T'', or portion $T_2$. In order actually to establish non-linear relationships of this character, one of the two horizontal edges of the openings in screen 28 may be curved essentially in the manner explained hereinabove with reference to the establishment of a relationship of the same character in case that unilateral sound track S is on film N. First, there is determined experimentally the curve representing that relationship between the width of portions T' and T'', or portion $T_2$, and the exposure of film P which results in the desired non-linear relationship between that width and the light transmission of the developed sound track 38. Next, the horizontal edges are curved so that a linear relationship is established between the slope of the curve at the point $u$ thereon and the height of the openings at two points $r'$ and $r''$ which are positioned on the curved horizontal edges so as to be symmetrical with respect to the vertical center lines of the openings. In the case of the opening which is to be used in conjunction with symmetrical track $S_1$, the distance of point $r'$ from the one vertical edge of the opening, and the distance of point $r''$ from its other vertical edge, is made equal to half the abscissa of point $u$. The opening thus is symmetrical about its vertical center line, and its curved horizontal edge is so disposed with respect to this center line that the length thereof is equal to the height of the opening for the maximum width of portions T' and T''. The height of the opening then varies in a relation to its distance from the two vertical edges of the opening, and the illumination of the compound image in a relation to its horizontal extension, which establishes such a relationship between the width of portions T' and T'' and the exposure of film P as to make the light transmission of the developed film P a function of the width of portions T' and T'' which is of the desired non-linear character. It is understood that, in order properly to achieve this end, the constant of proportionality between the height of the opening and the slope of the curve must be chosen so that, under the conditions of the actual printing operation, the exposure of film P falls along the aforementioned curve and not along a curve parallel thereto. Furthermore, when the opening now under discussion is provided in screen 28, screen 28 must be adjusted so that the vertical center line of the opening is conjugate to center line $C_1$—$C_1$ with respect to cylindrical lens 27 as film N, having thereon symmetrical track $S_1$, moves vertically through its plane.

In the case of the opening which is to be used in conjunction with symmetrical track $S_2$, on the other hand, it is the distance of points $r'$ and $r''$, respectively, from the vertical center line of the opening which is made equal to half the abscissa of point $u$. The opening thus is likewise symmetrical about its vertical center line, but its curved horizontal edge is so disposed with respect to this center line that the length thereof is equal to the height of the opening for the zero width of portion $T_2$. The height of the opening then varies in a relation to its distance from the vertical center line of the opening, and the illumination of the compound image in a relation to its horizontal extension, which establishes such a relationship between the width of portion $T_2$ and the exposure of film P as to make the light transmission of the developed film P a function of the width of portion $T_2$ which is of the desired non-linear character. It is understood that, in order properly to achieve this end, the constant of proportionality between the height of the opening and the slope of the curve must be chosen so that, under the conditions of the actual printing operation, the exposure of film P falls along the aforementioned curve and not along a curve parallel thereto. Furthermore, when the opening now under discussion is provided in screen 28, screen 28 must be adjusted so that the vertical center line of the opening is conjugate to center line $C_2$—$C_2$ with respect to cylindrical lens 27 as film N, having thereon symmetrical track $S_2$, moves vertically through its plane.

Since the two last mentioned openings are, in general, similar to openings 190 and 290, reference is made to Figs. 24 and 25 by way of further explanation.

Horizontal edges 74, 84, 94, 174, 274, 184, 284, 174a, 184a, 194 and 294, are shown in Figs. 10 to 14 and 18 to 25, and have been described hereinabove, as being straight and perpendicular to the two vertical edges of openings 70 and 70a, 80 and 80a, 90, 170, 270, 180, 280, 170a, 180a, 190, and 290, respectively. However, the height of the opening in screen 28 may be varied also by shaping the two horizontal edges of the opening so that neither is straight and/or perpendicular to the two vertical edges of the opening. In this manner, too, there may be established the relationships which have been described hereinbefore as being established by the openings enumerated above between the height of the opening and its distance from one of the two vertical edges of the opening, or both these edges, or the vertical center line of the opening, or any other such relationship. For example, the opening 370, shown in Fig. 26, has two straight edges 371 and 374 both of which extend slant-wise in a horizontal direction so as to be inclined with respect to the straight and parallel vertical edges 372 and 373 of the opening 370, horizontal edge 371 pointing upward, and horizontal edge 374 pointing downward, from vertical edge 372 to vertical edge 373. The height of opening 370 therefore varies in linear relation to its distance from vertical edge 372, and in such a manner that it increases when this distance increases. Opening 370 may thus be substituted for opening 70 as bounded by inclined edge 71, it being understood that screen 28 then must be adjusted so that the image of vertical edge 372, which is formed in the plane of film N by the action of cylindrical lens 27 in the horizontal plane, coincides with the vertical boundary 52 of sound track S when film N moves vertically through its plane.

Condenser lens 26 is shown in Figs. 8 and 9, and has been described hereinabove, as forming, by its action in the vertical plane, the image of the height of lamp filament 10 in the plane of film N. Condenser lens 26 may, however, form this image also at any other position beyond screen 28, for example, at cylindrical lens 30. In any such case, the image of the height of lamp filament 10 is out of focus with respect to the plane of film N, and for that reason the light flux is evenly distributed over only the central portion of the vertical levels composing the compound image in the plane of film N. The horizontal edges, therefore, of the compound image now are blurred, and hence must be screened off either at film N or at film P, for example, by the horizontal edges 34 and 37 of the rectangular opening 36 in the screen 35 (Fig. 5) which is placed in front of the plane of film P of the optical system of Figs. 8 and 9. It is advantageous now to make the opening of varying height in screen 28 symmetrical about its horizontal center line in the manner shown in Fig. 26 for opening 370 which is symmetrical about its horizontal center line 377—377.

It should be noted that, in the example illustrated in Figs. 8 and 9, condenser lens 26 is spherical. It therefore acts also in the horizontal plane, and thus tends to form an image also of the horizontal extension of lamp filament 10. But on account of the imagery of the opening in screen 28 by the action of cylindrical lens 27 in the horizontal plane, the action of spherical condenser lens 26 in this plane has no effect upon the formation of the compound image in the plane of film N.

The preferred arrangement for forming in the plane of film N a light spot of horizontally varying illumination thus includes a screen with an opening of varying height, and imaging means, such as the cylindrical lens 27, which act in only the horizontal plane and form an image of the opening of varying height in the plane through which the negative film moves in a vertical direction. The arrangement also includes means for uniformly illuminating the opening, which means comprise a light source and a condenser lens acting in the vertical plane and forming an image of the light source at a position beyond the screen with the opening. This arrangement for illuminating the variable area sound track in a non-uniform manner may be employed not only in the conversion sound printing optical system shown in Figs. 8 and 9 by way of example, but also in any other printing optical system in which the conversion of a variable area sound track into a variable density sound track is effected substantially by permitting the light flux proceeding through the optical system to be diffused horizontally at the plane through which the positive film moves in a vertical direction. Such other optical systems are disclosed, for example, in Figs. 6 and 7 of application Serial No. 449,798 and in Patents Nos. 2,298,422 and 2,366,040.

It is, of course, possible to replace the screen 28 of the optical system of Figs. 8 and 9 by the screen 15 with the rectangular opening 16 whose height is constant at all points on its two horizontal edges (Fig. 3). When this substitution is made, the compound image formed in the plane of film N of the optical system of Figs. 8 and 9 is a uniformly illuminated light spot such as light spot 17 (Fig. 4). The compound image may then be transformed into a light spot of horizontally varying illumination by providing in the optical system of Figs. 8 and 9 shading member 19 (Fig. 7), for example, by placing it adjacent to screen 15 in the manner illustrated in Figs. 1 and 2. As has already been pointed out hereinabove, there may be given to shading member 19 absorption characteristics which result in the formation of light spots of the type illustrated by light spots 118 and 218 (Figs. 16 and 17) as well as of the type illustrated by light spot 18 (Fig. 6). In particular, there may be given to shading member 19 also absorption characteristics which result in such relations between the illumination and the horizontal extension of those light spots that a linear relationship, and non-linear relationships of any character, are established between the light transmission of the developed film P and the width of portion T, portions T' and T'', and portion $T_2$, respectively. Finally, light shading members such as shading member 19 may be employed in conjunction with a screen having a rectangular opening, such as screen 15, for forming light spots of horizontally varying illumination also in the conversion sound printing optical systems referred to at the end of the preceding paragraph. In any one of these optical systems as well as in the optical system of Figs. 1 and 2, and in the optical system of Figs. 8 and 9 when screen 15 is provided therein, the light shading member may be placed not only adjacent to the screen with the rectangular opening but also at other suitable positions, for example, adjacent to the plane of film N.

It will readily be appreciated by those skilled in the art that it is one of the main features of the present invention that it affords means for establishing, in conversion sound printing optical systems of the type repeatedly characterized hereinabove, non-linear relationships between the width of the transparent portion of the variable area sound track and the exposure of the positive film which result in linear relationships between that width and the light transmission of the developed variable density sound track on either the positive film, or a film onto which it was printed from the positive film. In both cases, this result is achieved without imposing restrictions, on account of their emulsion characteristics, on the choice of the film stocks usable as the two films, and without necessitating a reduction of the volume range of the reproduced sound by the mode of employment of these film stocks.

In the foregoing description of the present invention, and in the appended claims, the term "straight," in contradistinction to the term "curved," is used with reference to the edge of an opening as meaning that the contour of either the entire edge, or of every one of its parts, is a first degree curve. Straight edges within the meaning of the term as used throughout this specification therefore are, for example, edges 78 and 79 of opening 70a (Fig. 12), edge 171 of opening 170 (Fig. 18) and edge 271 of opening 270 (Fig. 19), as well as edges 71 and 76 of opening 70 (Fig. 10).

What is claimed is:

1. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening whose height varies in linear relation to the slope of the curve representing that relationship between said width and said exposure which results in said light transmission being substantially linearly related to said width after said positive film has been developed, the constant of proportionality between said height and said slope being chosen so that said exposure falls along said curve; and second imaging means acting in only the horizontal plane as the sole means for forming an image of said opening in said second plane.

2. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening whose height varies in linear relation to the slope of a curve representing a relationship between said width and said exposure which results in said light transmission being non-linearly related to said width after said positive film has been developed, the constant of proportionality between said height and said slope being chosen so that said exposure falls along said curve; and second imaging means acting in only the horizontal plane as the sole means for forming an image of said opening in said second plane.

3. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening whose height varies in linear relation to the slope of a curve representing a relationship between said width and said exposure which results in a non-linear relationship between said width and said light transmission after said variable density sound track has been developed, said non-linear relationship being of such a character that, when a print is made from said developed variable density sound track, the light transmission of said print after development thereof is substantially linearly related to said width, and the constant of proportionality between said height and said slope being chosen so that said exposure falls along said curve; and second imaging means acting in only the horizontal plane as the sole means for forming an image of said opening in said second plane.

4. In a printing optical system wherein a positive film may move vertically through a first plane so that its exposure may be effected by light flux passing through a first light spot, said first light spot being of vertically varying illumination, the combination of a second plane through which a negative film having thereon a variable area sound track may move vertically, said variable area sound track having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening whose height varies in linear relation to the slope of a curve representing a non-linear relationship between said width and said exposure, the constant of proportionality between said height and said slope being chosen so that said exposure falls along said curve; and second imaging means acting in only the horizontal plane as the sole means for forming an image of said opening in said second plane.

5. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track being symmetrical about its vertical center line and having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening of varying height, said opening being symmetrical about its vertical center line, said height varying on both sides of said last mentioned center line in the same sense and in linear relation to the slope of the curve representing that relationship between said width and said exposure which results in said light transmission being substantially linearly related to said width after said positive film has been developed, and the constant of proportionality between said height and said slope being chosen so that said exposure falls along said curve; and second imaging means acting in only the horizontal plane as the sole means for forming an image of said opening in said second plane, said center line of said opening and said center line of said variable area sound track being conjugate with respect to said second imaging means when said negative film moves through said second plane.

6. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track being symmetrical about its vertical center line and having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening of varying height, said opening being symmetrical about its vertical center line, said height varying on both sides of said last mentioned center line in the same sense and in linear relation to the slope of a curve representing a relationship between said width and said exposure which results in said light transmission being non-linearly related to said width after said positive film has been developed, and the constant of proportionality between said height and said slope being chosen so that said exposure falls along said curve; and second imaging means acting in only the horizontal plane as the sole means for forming an image of said opening in said second plane, said center line of said opening and said center line of said variable area sound track being conjugate with respect to said second imaging means when said negative film moves through said second plane.

7. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track being symmetrical about its vertical center line and having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening of varying height, said opening being symmetrical about its vertical center line, said height varying on both sides of said last mentioned center line in the same sense and in linear relation to the slope of a curve representing a relationship between said width and said exposure which results in a non-linear relationship between said width and said light transmission after said variable density sound track has been developed, said non-linear relationship being of such a character that, when a print is made from said developed variable density sound track, the light transmission of said print after development thereof is substantially linearly related to said width, and the constant of proportionality between said height and said slope being chosen so that said exposure falls along said curve; and second imaging means acting in only the horizontal plane as the sole means for forming an image of said opening in said second plane, said center line of said opening and said center line of said variable area sound track being conjugate with respect to said second imaging means when said negative film moves through said second plane.

8. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track being symmetrical about its vertical center line and having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening of varying height, said opening being symmetrical about its vertical center line, said height varying on both sides of said last mentioned center line in the same sense and in linear relation to the slope of the curve representing that relationship between said width and said exposure which results in said light transmission being substantially linearly related to said width after said positive film has been developed, said last mentioned center line being equal to said height for the maximum value of said width so that said relationship is established when said transparent portion of said symmetrical variable area sound track is divided in two by said opaque portion, and the constant of proportionality between said height and said slope being chosen so that said exposure falls along said curve; and second imaging means acting in only the horizontal plane as the sole means for forming an image of said opening in said second plane, said center line of said opening and said center line of said variable area sound track being conjugate with respect to said second imaging means when said negative film moves through said second plane.

9. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track being symmetrical about its vertical center line and having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening of varying height, said opening being symmetrical about its vertical center line, said height varying on both sides of said last mentioned center line in the same sense and in linear relation to the slope of a curve representing a relationship between said width and said exposure which results in a non-linear relationship between said width and said light transmission after said variable density sound track has been developed, said non-linear relationship being of such a character that, when a print is made from said developed variable density sound track, the light transmission of said print after development thereof is substantially linearly related to said width, said last mentioned center line being equal to said height for the maximum value of said width so that said first mentioned relationship is established when said transparent portion of said symmetrical variable area sound track is divided in two by said opaque portion, and the constant of proportionality between said height and said slope being chosen so that said exposure falls along said curve; and second imaging means acting in only the horizontal plane as the sole means for forming an image of said opening in said second plane, said center line of said opening and said center line of said variable area sound track being conjugate with respect to said second imaging means when said negative film moves through said second plane.

10. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track being symmetrical about its vertical center line and having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening of varying height, said opening being symmetrical about its vertical center line, said height varying on both sides of said last mentioned center line in the same sense and in linear relation to the slope of the curve representing that relationship between said width and said exposure which results in said light transmission being substantially linearly related to said width after said positive film has been developed, said last mentioned center line being equal to said height for the zero value of said width so that said relationship is established when said opaque portion of said symmetrical variable area sound track is divided in two by said transparent portion, and the constant of proportionality between said height and said slope being chosen so that said exposure falls along said curve; and second imaging means acting in only the horizontal plane as the sole means for forming an image of said opening in said second plane, said center line of said opening and said center line of said variable area sound track being conjugate with respect to said second imaging means when said negative film moves through said second plane.

11. In a printing optical system wherein a positive film may move vertically through a first plane so that its exposure may be effected by light flux passing through a first light spot, said first light spot being of vertically varying illumination, whereby a variable density sound track having a light transmission is produced on said positive film, the combination of a second plane through which a negative film having thereon a variable area sound track may move vertically, said variable area sound track being symmetrical about its vertical center line and having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening of varying height, said opening being symmetrical about its vertical center line, said height varying on both sides of said last mentioned center line in the same sense and in linear relation to the slope of a curve representing a relationship between said width and said exposure which results in a non-linear relationship between said width and said light transmission after said variable density sound track has been developed, said non-linear relationship being of such a character that, when a print is made from said developed variable density sound track, the light transmission of said print after development thereof is substantially linearly related to said width, said last mentioned center line being equal to said height for the zero value of said width so that said first mentioned relationship is established when said opaque portion of said symmetrical variable area sound track is divided in two by said transparent portion, and the constant of proportionality between said height and said slope being chosen so that said exposure falls along said curve; and second imaging means acting in only the horizontal plane as the sole means for forming an image of said opening in said second plane, said center line of said opening and said center line of said variable area sound track being conjugate with respect to said second imaging means when said negative film moves through said second plane.

12. In a printing optical system wherein a positive film may move vertically through a first plane so that its exposure may be effected by light flux passing through a first light spot, said first light spot being of vertically varying illumination, the combination of a second plane through which a negative film having thereon a variable area sound track may move vertically, said variable area sound track being symmetrical about its vertical center line and having an opaque portion and a transparent portion which varies in width; means for forming in said second plane a second light spot, said second light spot being of horizontally varying illumination and more or less obscured by said opaque portion when said negative film moves through said second plane; and first imaging means acting in only the vertical plane as the sole means for forming at a position an image of said second light spot as obscured by said opaque portion so that said image is said first light spot; said means for forming said second light spot including: a screen having a uniformly illuminated opening of varying height, said opening having a vertical center line and said height varying on both sides of said last mentioned center line in the same sense and in linear relation to the slope of a curve representing a non-linear relationship between said width and said exposure so that said opening is symmetrical about said last mentioned center line, the constant of proportionality between said height and said slope being chosen so that said exposure falls along said curve; and second imaging means acting in only the horizontal plane as the sole means for forming an image of said opening in said second plane, said center line of said opening and said center line of said variable area sound track being conjugate with respect to said second imaging means when said negative film moves through said second plane.

ABE OFFNER.